US012598544B2

(12) United States Patent　　　　(10) Patent No.:　US 12,598,544 B2
Kunz et al.　　　　　　　　　　　　(45) Date of Patent:　　　Apr. 7, 2026

(54) CORRELATING A USER EQUIPMENT AND AN ACCESS AND MOBILITY MANAGEMENT FUNCTION

(71) Applicant: LENOVO (BEIJING) LIMITED, Beijing (CN)

(72) Inventors: Andreas Kunz, Ladenburg (DE); Sheeba Backia Mary Baskaran, Friedrichsdorf (DE); Tingfang Tang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 400 days.

(21) Appl. No.: 18/250,390

(22) PCT Filed: Oct. 29, 2020

(86) PCT No.: PCT/CN2020/124697
　　　§ 371 (c)(1),
　　　(2) Date: Apr. 25, 2023

(87) PCT Pub. No.: WO2022/087947
　　　PCT Pub. Date: May 5, 2022

(65) Prior Publication Data
　　　US 2023/0403640 A1　　Dec. 14, 2023

(51) Int. Cl.
　　　*H04W 48/16*　　　(2009.01)
　　　*H04W 8/02*　　　(2009.01)
　　　(Continued)

(52) U.S. Cl.
　　　CPC ............. *H04W 48/16* (2013.01); *H04W 8/02* (2013.01); *H04W 8/26* (2013.01); *H04W 80/04* (2013.01)

(58) Field of Classification Search
　　　CPC ......... H04W 48/16; H04W 8/02; H04W 8/26; H04W 80/04; H04W 76/11; H04L 12/12; H04L 61/4588
　　　See application file for complete search history.

(56) References Cited

U.S. PATENT DOCUMENTS

2019/0159082 A1　　5/2019　Talebi et al.
2019/0268806 A1*　8/2019　Zhu ................... H04W 28/0247
　　　　　　　　　　(Continued)

FOREIGN PATENT DOCUMENTS

CN　　　108882364 A　　11/2018
CN　　　110166929 A　　8/2019
　　　　　　　(Continued)

OTHER PUBLICATIONS

International Searching Authority, "Written Opinion of the International Searching Authority," PCT/CN2020/124697, Jul. 8, 2021, pp. 1-3.
(Continued)

*Primary Examiner* — Shawn D Miller
(74) *Attorney, Agent, or Firm* — Kunzler Needham & Hilton

(57) ABSTRACT

Apparatuses, methods, and systems are disclosed for correlating a user equipment and an access and mobility management function. One method (900) includes determining (902), at a first network device, a correlation between a user equipment identifier for a user equipment and an access and mobility management function identifier for an access and mobility management function. The method (900) includes storing (904), by the first network device, correlation information indicating the correlation between the user equipment identifier and the access and mobility management function identifier. The method (900) includes receiving (906), at the first network device, a request from a second network device, wherein the request comprises the user (Continued)

equipment identifier. The method (900) includes determining (908), by the first network device, the access and mobility management function identifier using the user equipment identifier in the request.

19 Claims, 9 Drawing Sheets

(51) Int. Cl.
    *H04W 8/26*        (2009.01)
    *H04W 80/04*       (2009.01)

(56)                References Cited

U.S. PATENT DOCUMENTS

2020/0053638  A1      2/2020  Edge et al.

| | | | | |
|---|---|---|---|---|
| 2020/0068047 | A1* | 2/2020 | Huang | H04L 69/08 |
| 2020/0120182 | A1 | 4/2020 | Kotecha et al. | |
| 2021/0211215 | A1* | 7/2021 | Zhu | H04J 3/0685 |

FOREIGN PATENT DOCUMENTS

| | | | |
|---|---|---|---|
| CN | 110603830 | A | 12/2019 |
| WO | 2020015639 | A1 | 1/2020 |

OTHER PUBLICATIONS

3GPP, "3rd Generation Partnership Project; Technical Specification Group Services and System Aspects; Study on Security Aspects of Enhancement of Support for Edge Computing in 5GC (Release 17)", 3GPP TR 33.839 V0.2.0, Oct. 2020, pp. 1-43.

* cited by examiner

100

104

104

102

104

102

102

200

300

800

900

1

CORRELATING A USER EQUIPMENT AND AN ACCESS AND MOBILITY MANAGEMENT FUNCTION

FIELD

The subject matter disclosed herein relates generally to wireless communications and more particularly relates to correlating a user equipment and an access and mobility management function.

BACKGROUND

The following abbreviations are herewith defined, at least some of which are referred to within the following description: Third Generation Partnership Project ("3GPP"), 5G Globally Unique Temporary UE Identifier ("5G-GUTI"), 5G QoS Indicator ("5QI"), Authentication Authorization and Accounting ("AAA"), Acknowledge Mode ("AM"), Access and Mobility Management Function ("AMF"), Aperiodic ("AP"), Authentication Server Function ("AUSF"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Code Block Group ("CBG"), CBG Flushing Out Information ("CBGFI"), CBG Transmission Information ("CBGTI"), Component Carrier ("CC"), Control Channel Element ("CCE"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), Cyclic Redundancy Check ("CRC"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink Feedback Information ("DFI"), Downlink ("DL"), Discrete Fourier Transform Spread OFDM ("DFT-s-fOFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Edge Application Server ("EAS"), Edge Configuration Server ("ECS"), Edge Enabler Client ("EEC"), Edge Enabler Server ("EES"), Frequency Division Duplex ("FDD"), Frequency Division Multiplexing ("FDM"), Frequency Division Multiple Access ("FDMA"), Fully-Qualified Domain Name ("FQDN"), Frequency Range ("FR"), 450 MHz-6000 MHz ("FR1"), 24250 MHz-52600 MHz ("FR2"), Globally Unique Temporary UE Identifier ("GUTI"), Hybrid Automatic Repeat Request ("HARQ"), High-Definition Multimedia Interface ("HDMI"), High-Speed Train ("HST"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Key Derivation Function ("KDF"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Least-Significant Bit ("LSB"), Long Term Evolution ("LTE"), Levels of Automation ("LoA"), Medium Access Control ("MAC"), Mes-

2 sage Authentication Code for Integrity ("MAC-I"), Modulation Coding Scheme ("MCS"), Multi DCI ("M-DCI"), Mobile Edge Computing ("MEC"), Master Information Block ("MIB"), Multiple Input Multiple Output ("MIMO"), Maximum Permissible Exposure ("MPE"), Most-Significant Bit ("MSB"), Mobile Station International Subscriber Directory Number ("MSISDN"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Network Access Identifier ("NAI"), Non Access Stratum ("NAS"), Non-Coherent Joint Transmission ("NCJT"), Network Exposure Function ("NEF"), Next Generation ("NG"), Next Generation Node B ("gNB"), Generic Public Subscription Identifier ("GPSI"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Permanent Equipment Identifier ("PEI"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PTRS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Redundancy Version ("RV"), Receive ("RX"), Security Association ("SA"), Service Based Architecture ("SBA"), Single Carrier Frequency Domain Spread Spectrum ("SC-FDSS"), Secondary Cell ("SCell"), Spatial Channel Model ("SCM"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Session Management Function ("SMF"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Subscription Concealed Identifier ("SUCI"), Subscription Permanent Identifier ("SUPI"), Transport Block ("TB"), Transmission Configuration Indication ("TCI"), Time Division Duplex ("TDD"), Time Division Multiplexing ("TDM"), Temporary Mobile Subscriber Identity ("TMSI"), Transmit Power Control ("TPC"), Transmitted Precoding Matrix Indicator ("TPMI"), Transmission Reception Point ("TRP"), Transmission Reference Signal ("TRS"), Technical Standard ("TS"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), User Plane Function ("UPF"), Ultra Reliable Low Latency Communication ("URLLC"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Virtual Resource Block ("VRB"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, an AMF may be used.

BRIEF SUMMARY

Methods for correlating a user equipment and an access and mobility management function are disclosed. Apparatuses and systems also perform the functions of the methods. In one embodiment, the method includes determining, at a first network device, a correlation between a user equipment identifier for a user equipment and an access and mobility management function identifier for an access and mobility management function. In certain embodiments, the method includes storing, by the first network device, correlation information indicating the correlation between the user equipment identifier and the access and mobility management function identifier. In various embodiments, the method includes receiving, at the first network device, a request from a second network device, wherein the request comprises the user equipment identifier. In some embodiments, the method includes determining, by the first network device, the access and mobility management function identifier using the user equipment identifier in the request.

An apparatus for correlating a user equipment and an access and mobility management function, in one embodiment, includes a first network device. In various embodiments, the apparatus includes a processor that: determines a correlation between a user equipment identifier for a user equipment and an access and mobility management function identifier for an access and mobility management function; and stores correlation information indicating the correlation between the user equipment identifier and the access and mobility management function identifier. In certain embodiments, the apparatus includes a receiver that receives a request from a second network device, wherein the request comprises the user equipment identifier. In some embodiments, the processor determines the access and mobility management function identifier using the user equipment identifier in the request.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
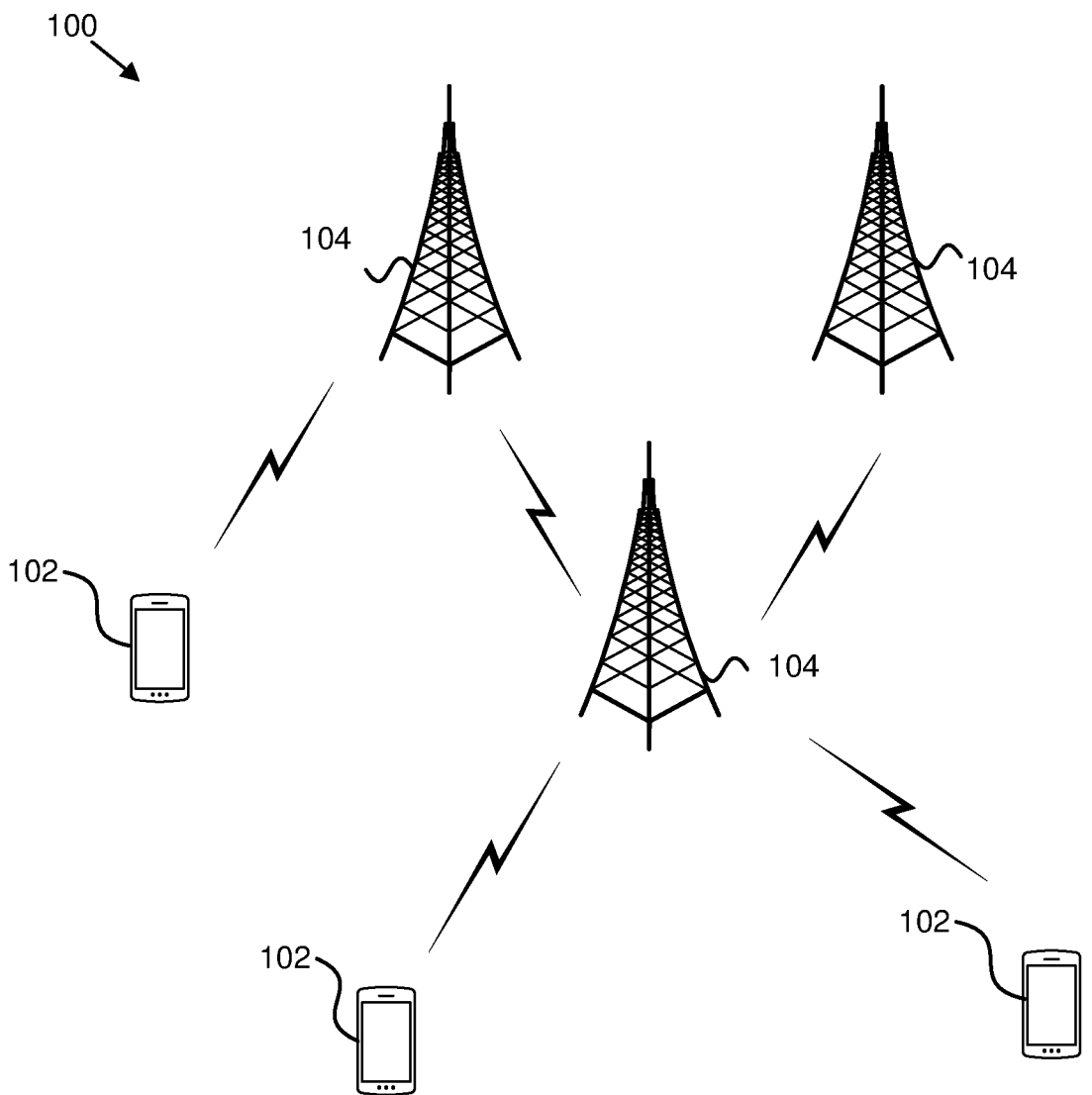
FIG. 1 is a schematic block diagram illustrating one embodiment of a wireless communication system for correlating a user equipment and an access and mobility management function.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for correlating a user equipment and an access and mobility management function. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 (e.g., first network device) may determine a correlation between a user equipment identifier for a user equipment (e.g., remote unit 102) and an access and mobility management function identifier for an access and mobility management function. In certain embodiments, the network unit 104 may store correlation information indicating the correlation between the user equipment identifier and the access and mobility management function identifier. In various embodiments, the network unit 104 may receive a request from a second network device, wherein the request comprises the user equipment identifier. In some embodiments, the network unit 104 may determine the access and mobility management function identifier using the user equipment identifier in the request. Accordingly, a network unit 104 may be used for correlating a user equipment and an access and mobility management function.

Figure 2:
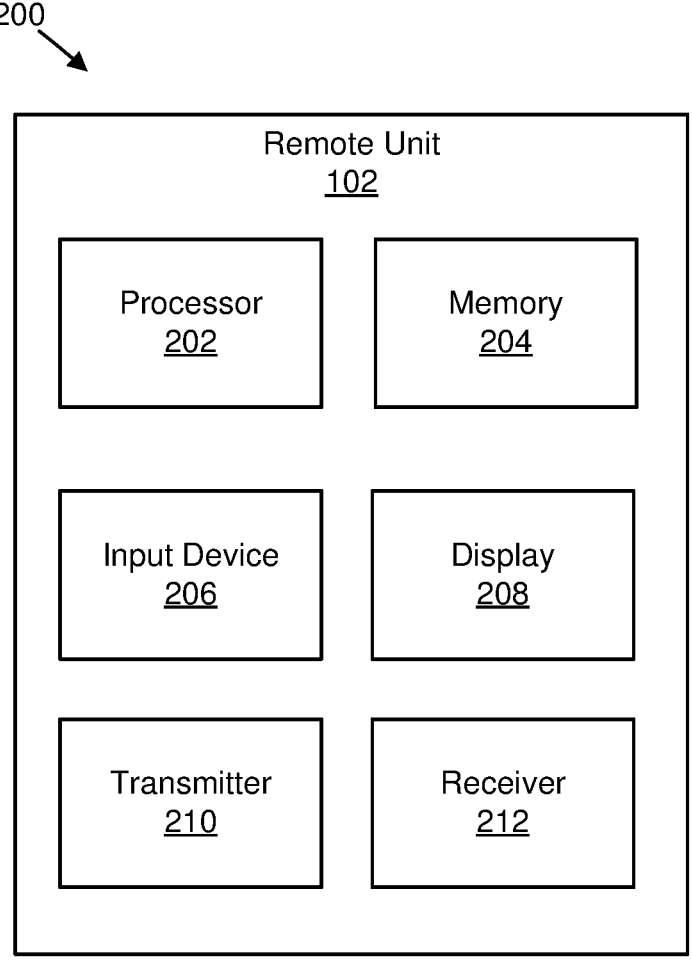
FIG. 2 is a schematic block diagram illustrating one embodiment of an apparatus that may be used for correlating a user equipment and an access and mobility management function.

FIG. 2 depicts one embodiment of an apparatus 200 that may be used for correlating a user equipment and an access and mobility management function. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
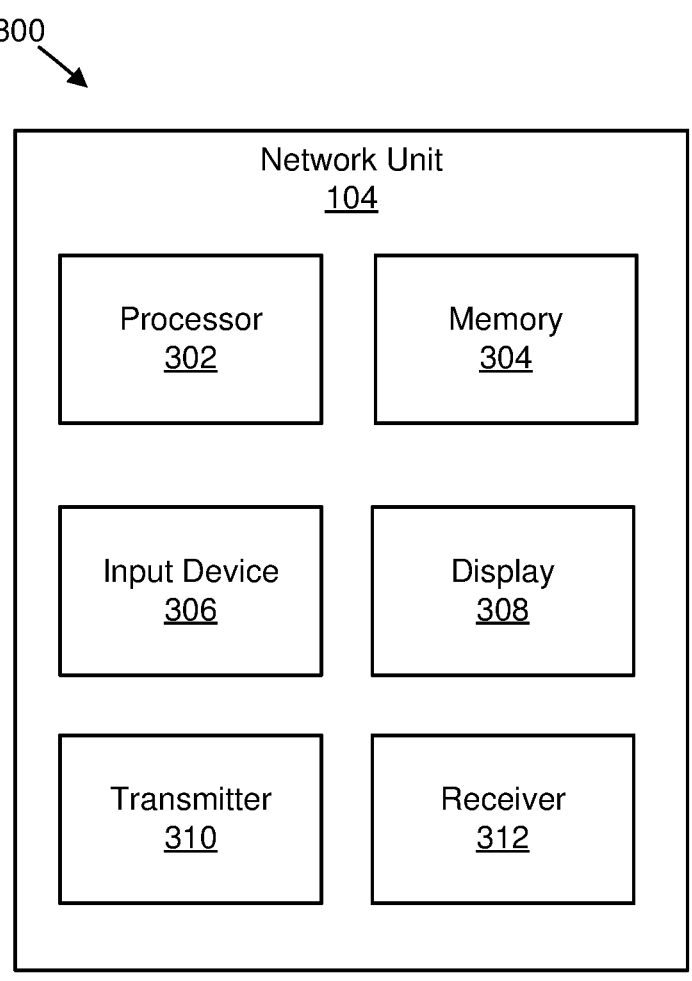
FIG. 3 is a schematic block diagram illustrating one embodiment of an apparatus that may be used for correlating a user equipment and an access and mobility management function.

FIG. 3 depicts one embodiment of an apparatus 300 that may be used for correlating a user equipment and an access and mobility management function. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the apparatus includes a first network device. In some embodiments, the processor 302 may: determine a correlation between a user equipment identifier for a user equipment and an access and mobility management function identifier for an access and mobility management function; and store correlation information indicating the correlation between the user equipment identifier and the access and mobility management function identifier. In certain embodiments, the receiver 312 may receive a request from a second network device, wherein the request comprises the user equipment identifier. In some embodiments, the processor 302 determines the access and mobility management function identifier using the user equipment identifier in the request.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, for some MEC services, an EEC in a UE may authenticate with an MEC platform (e.g., ECS, EES, and/or EAS. In certain embodiments, it may not be clear how an ECS can send messages to a serving AMF (e.g., how messages are routed from the ECS to the AMF).

In some embodiments, routing messages may depend on a type of a UE ID. As may be appreciated, a UE ID may indicate one or more of the following identifiers: SUPI, SUCI, GPSI, EEC ID, PEI, IP address, and/or a specific NAI to route to an interworking function, (e.g. a NEF or a new entity). As described herein, an NEF may indicate any suitable interworking function to perform corresponding actions.

In various embodiments, if a specific NAI is used as a UE ID, then a username part may be used for a binding and a realm for routing to an NEF or interworking function.

In certain embodiments, if applied in a 5G architecture, interactions between an NEF and another device (e.g., AMF, UDM, SMF) may follow general SBA principles. In such embodiments, service operations for corresponding functionalities may be provided if invoked.

In a first embodiment, there may be an identifier binding in an NEF. In the first embodiment, the NEF may take care of a binding between a UE ID and an AMF ID. Moreover, the AMF ID may be part of a GUTI.

Figure 4:
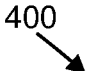
FIG. 4 is a communications diagram illustrating one embodiment of communications for correlating a user equipment and an access and mobility management function.
Figure 4:
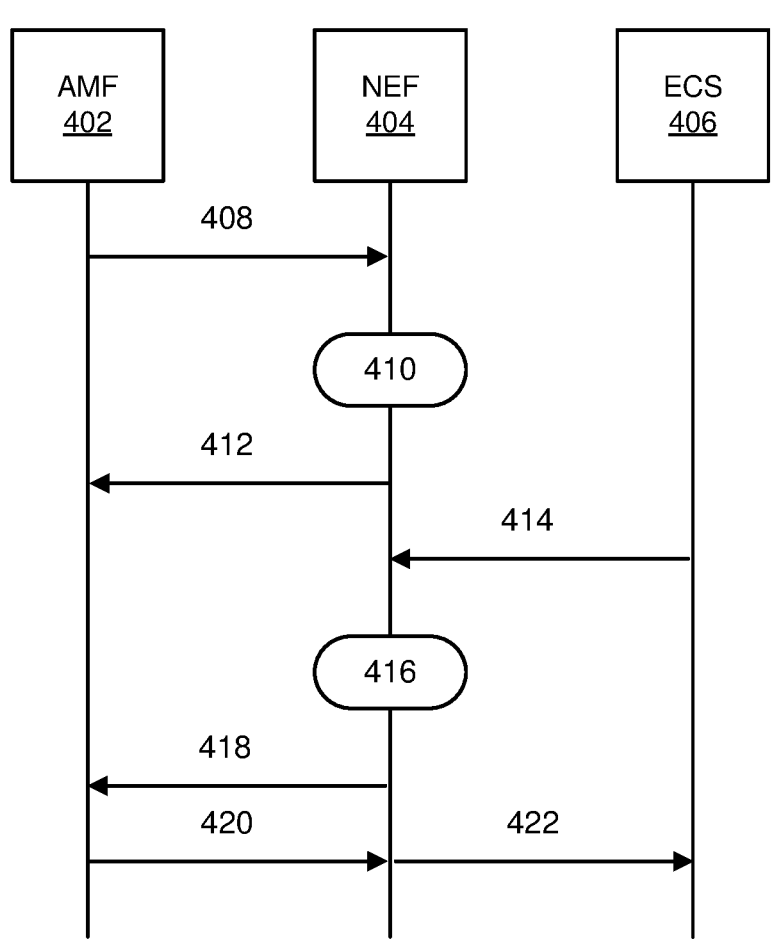

FIG. 4 is a communications diagram illustrating one embodiment of communications 400 for correlating a user equipment and an access and mobility management function (e.g., illustrating an example of the first embodiment). The communications 400 include messages transmitted between an AMF 402, an NEF 404, and an ECS 406. As may be appreciated, each communication of the communications 400 may include one or more messages.

In a first communication 408 transmitted from the AMF 402 to the NEF 404, the AMF 402 sends a registration message (e.g., registration request) to the NEF 404. The registration message may include a UE ID and it's AMF ID. The AMF 402 may send a GUTI of the UE instead of the UE ID. The GUTI may include the AMF ID.

The NEF 404 stores 410 a binding (e.g., a mapping, information indicating a correlation) of the two identifiers (e.g., UE ID, AMF ID) to facilitate responding to future queries (e.g., from the ECS 406). The NEF 404 may subscribe to updates from the AMF 402 (e.g., if the AMF 402 changes, such as due to mobility).

In a second communication 412 transmitted from the NEF 404 to the AMF 402, the NEF 404 acknowledges the registration message (e.g., registration request) from the AMF 402 with a message transmitted to the AMF 402 to indicate success of binding the identifiers.

In a third communication 414 transmitted from the ECS 406 to the NEF 404 (e.g., at a later point in time in response to a UE sending a registration request to the ECS 406), the ECS 406 (e.g., to authenticate the UE) sends a request message including the UE ID to the NEF 404. If the UE ID from the ECS 406 is different from the UE ID in the first communication 408, a mapping of the two IDs may be needed. The mapping may be done by the NEF 404 or a UDM. The request message may be routed to the AMF 402, but the ECS 406 only knows the NEF 404 (e.g., based on pre-configuration or based on a part of the UE ID for routing—such as a realm pointing to the NEF 404).

The NEF 404 authorizes 416 the request from the ECS 406 and looks up the AMF ID based on the UE ID. The NEF 404 stores contact information corresponding to the ECS 406 (e.g., IP address, source NAI of the ECS 406, and so forth) with the UE ID to facilitate routing an answer from the AMF 404 back to the ECS 406.

In a fourth communication 418 transmitted from the NEF 404 to the AMF 402, the NEF 404 forwards the request message from the ECS 406 including the UE ID to the AMF 402.

In a fifth communication 420 transmitted from the AMF 402 to the NEF 404, and in a sixth communication 422 transmitted from the NEF 404 to the ECS 406, a response from the AMF 402 is routed to the ECS 406 via the NEF 404 based on the stored ECS 406 contact information.

In a second embodiment, there may be an identifier binding in a UDM and/or UDR. In the second embodiment, a binding of a UE ID is performed in a UDM and/or a UDR. The UE ID may be part of a subscription profile or may be provided by the UE during a registration procedure with a network and/or updated by an AMF. The AMF may be known in the UDM due to a previous registration procedure.

Figure 5:
FIG. 5 is a communications diagram illustrating another embodiment of communications for correlating a user equipment and an access and mobility management function.
Figure 5:
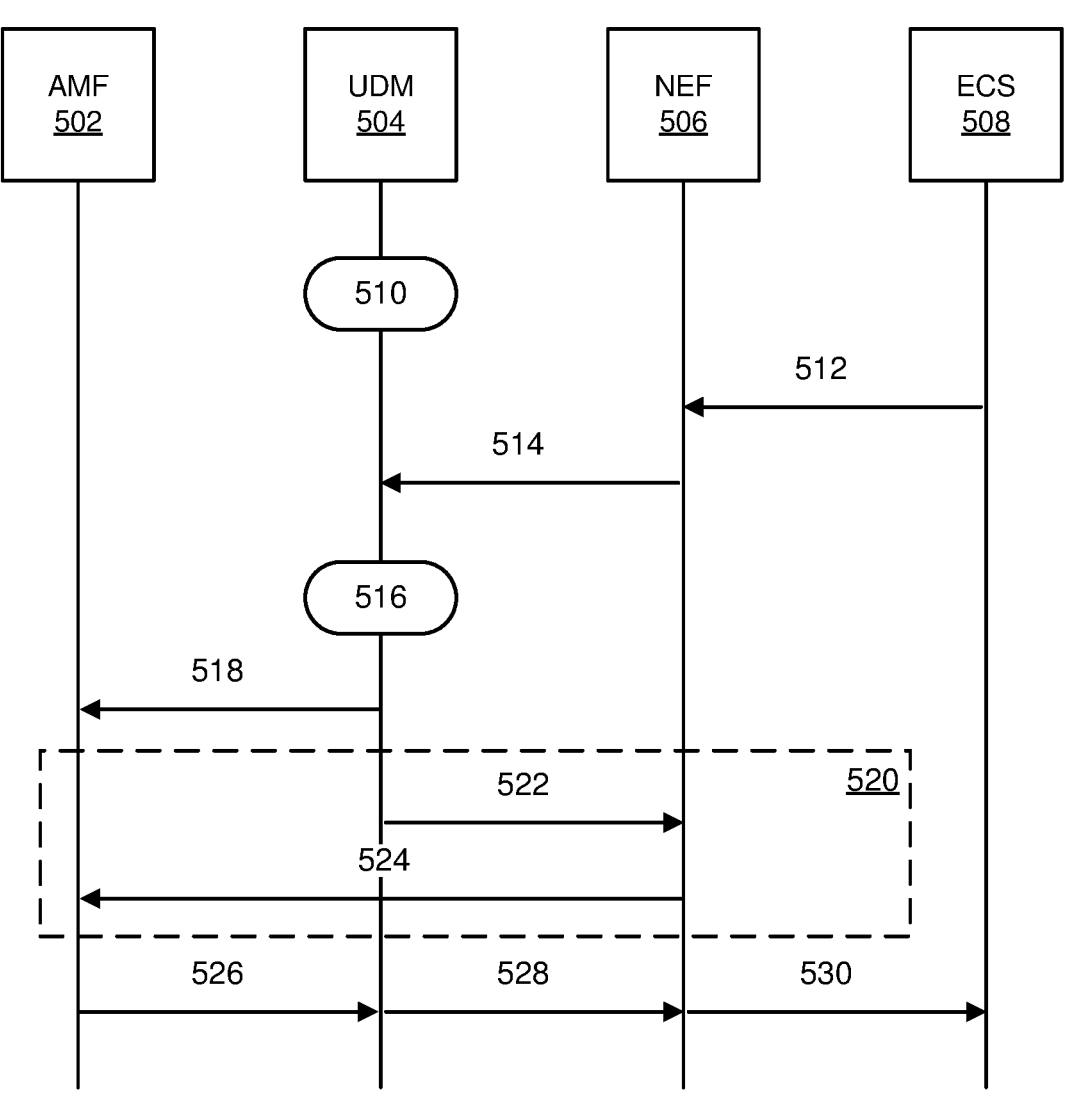

FIG. 5 is a communications diagram illustrating another embodiment of communications 500 for correlating a user equipment and an access and mobility management function (e.g., illustrating an example of the second embodiment). The communications 500 include messages transmitted between an AMF 502, a UDM 504 (e.g., UDM and/or UDR), an NEF 506, and an ECS 508. As may be appreciated, each communication of the communications 500 may include one or more messages.

In the UDM 504 (e.g., in a first step 510), a UE ID may be part of a subscription profile or may be provided by a UE during a registration procedure with a network and/or updated by the AMF 502. The AMF 502 may be known in the UDM 504 due to a previous registration procedure.

In a first communication 512 transmitted from the ECS 508 to the NEF 506 (e.g., at a later point in time and/or at a time that the UE sends a registration request to the ECS 508), the ECS 508 (e.g., to authenticate the UE) sends a request message including the UE ID to the NEF 506. The request message may be routed to the AMF 502, but the ECS 508 may only know the NEF 506 (e.g., based on a pre-configuration or based on a part of the UE ID for routing—such as a realm pointing to the NEF 506).

In a second communication 514 transmitted from the NEF 506 to the UDM 504, the NEF 506 authorizes the request from the ECS 508 and either sends the request message from the ECS 508 to the UDM 504 (e.g., option A) or an AMF 502 discovery request to the UDM 504 with the UE ID (e.g., option B). The NEF 506 stores the contact information corresponding to the ECS 508 (e.g., IP address, source NAI of the ECS, and so forth) with the UE ID to facilitate routing an answer from the AMF 502 back to the ECS 508. If the UE ID from the ECS 508 is different from the UE ID (e.g., in the first step 510), a mapping of the two IDs may be needed. The mapping of the two IDs may be executed by the NEF 506 or the UDM 504.

The UDM 504 performs 516 a lookup of the AMF ID based on the UE ID.

For option A, in a third communication 518 transmitted from the UDM 504 to the AMF 502, the UDM 504 may have received the full request message of the ECS 508 from the NEF 506 and the UDM 504 forwards the request message to the AMF 502 (e.g., serving AMF) based on the AMF ID.

For option B 520, in a fourth communication 522 transmitted from the UDM 504 to the NEF 506, the UDM 504 previously received an AMF discovery request from the NEF 506 and provides the AMF ID back to the NEF 506. The UDM 504 may replace the UE ID received from the NEF 506 with another UE ID, which may be understood by the AMF 502 to identify the UE.

Further, in option B 520, in a fifth communication 524 transmitted from the NEF 506 to the AMF 502, the NEF 506 forwards the request message from the ECS 508 including the UE ID to the AMF 502.

In a sixth communication 526 transmitted from the AMF 502 to the UDM 504, in a seventh communication 528 transmitted from the UDM 504 to the NEF 506, and/or in an eighth communication 530 transmitted from the NEF 506 to the ECS 508, a response from the AMF 502 is routed to the ECS 508 in the same manner that it was sent to the AMF 502 (e.g., via the UDM 504 for option A, or via the NEF 506 for option B 520 based on stored ECS contact information).

In a third embodiment, there may be identifier binding in an SMF. Moreover, in the third embodiment, an IP address of a UE may be used in a request from an ECS and the SMF may have a binding of the IP Address and other identifiers (e.g., UE ID and AMF ID). In various embodiments, the UE ID and the AMF ID may be represented with a GUTI in one identifier. In certain embodiments, the UE ID may be a PEI.

Figure 6:
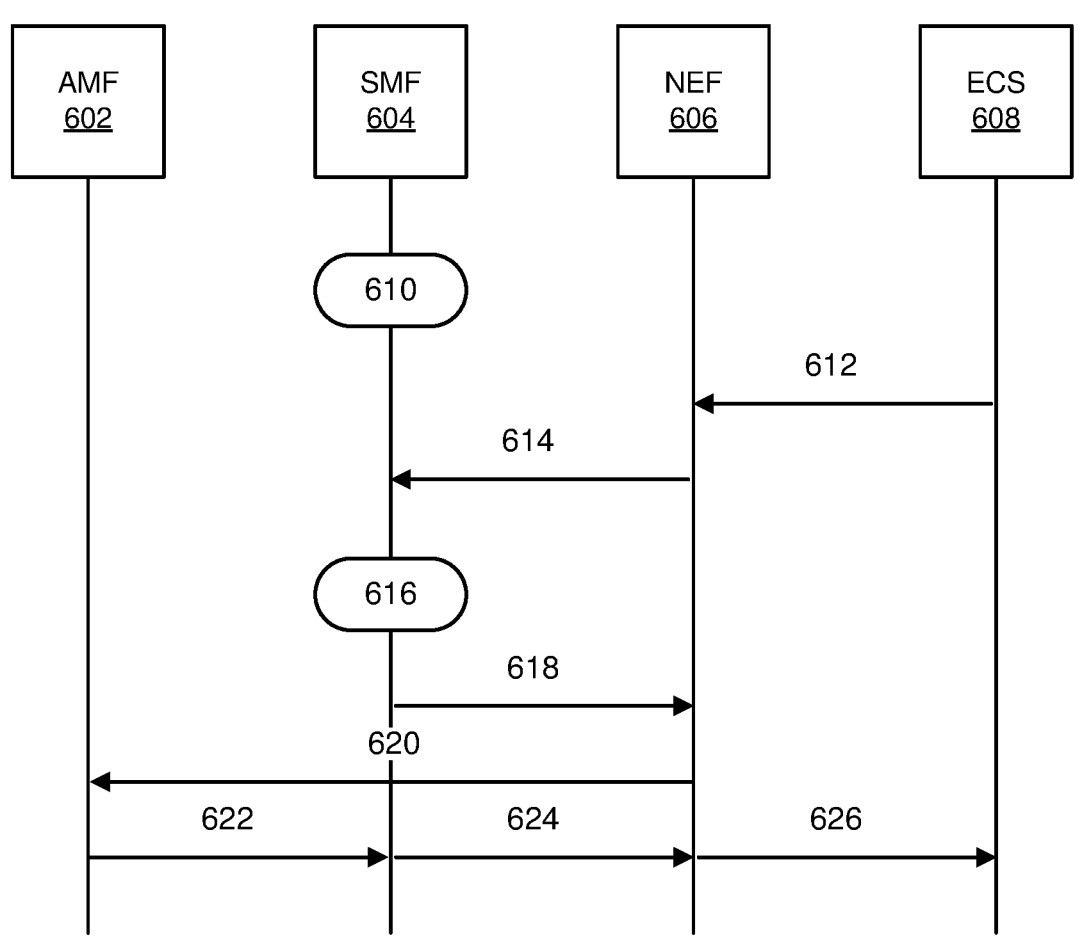
FIG. 6 is a communications diagram illustrating a further embodiment of communications for correlating a user equipment and an access and mobility management function.

FIG. 6 is a communications diagram illustrating a further embodiment of communications 600 for correlating a user equipment and an access and mobility management function (e.g., illustrating an example of the third embodiment). The communications 600 include messages transmitted between an AMF 602, an SMF 604, an NEF 606, and an ECS 608. As may be appreciated, each communication of the communications 600 may include one or more messages.

In the SMF 604 (e.g., in a first step 610), the UE IP address may be provided to the SMF 604 (e.g., during a PDU session setup procedure). In addition, an AMF ID and a UE ID (e.g., PEI) may be provided to and/or stored at the SMF 604. In certain embodiments, the SMF 604 may subscribe to the NEF 606 with the UE IP address.

In a first communication 612 transmitted from the ECS 608 to the NEF 606 (e.g., at a later point in time and/or at a time that the UE sends a registration request to the ECS 608), the ECS 608 (e.g., to authenticate the UE) sends a request message including the UE IP address and/or port number to the NEF 606. The request message may be routed to the AMF 602, but the ECS 608 may only know the NEF 606 (e.g., based on a pre-configuration).

In a second communication 614 transmitted from the NEF 606 to the SMF 604, the NEF 606 authorizes the request message from the ECS 608 and sends an AMF discovery request (or a notification, if the SMF 604 subscribed to this event) to the SMF 604 with the UE IP address and/or port number. The SMF 604 may be selected based on a previous subscription of the SMF 604 to the NEF 606. In various embodiments, as an alternative, the NEF 606 may send a request to the SMF 604 (e.g., serving SMF) for the UE IP address from a UDM. The NEF 606 stores the contact information of the ECS 608 (e.g., IP address, source NAI of the ECS, and so forth) with the UE IP address and/or port number to route an answer from the AMF 602 back to the ECS 608.

The SMF 604 performs 616 a lookup of the AMF ID and UE ID based on the UE IP address and/or port number.

In a third communication 618 transmitted from the SMF 604 to the NEF 606, the SMF 604 provides the AMF ID and the UE ID to the NEF 606.

In a fourth communication 620 transmitted from the NEF 606 to the AMF 602, the NEF 606 forwards the request message from the ECS 608 including the UE ID to the AMF 602.

In a fifth communication 622 transmitted from the AMF 602 to the SMF 604, in a sixth communication 624 transmitted from the SMF 604 to the NEF 606, and/or in a seventh communication 626 transmitted from the NEF 606 to the ECS 608, a response from the AMF 602 is routed to the ECS 608 in the same manner that it was sent to the AMF 602 (e.g., via the NEF 606 based on stored ECS contact information). The NEF 606 may include the UE IP address in the response to the ECS 608 so that the ECS 608 can correlate messages.

In a fourth embodiment, an authentication procedure may be performed based on the first embodiment.

Figure 7:
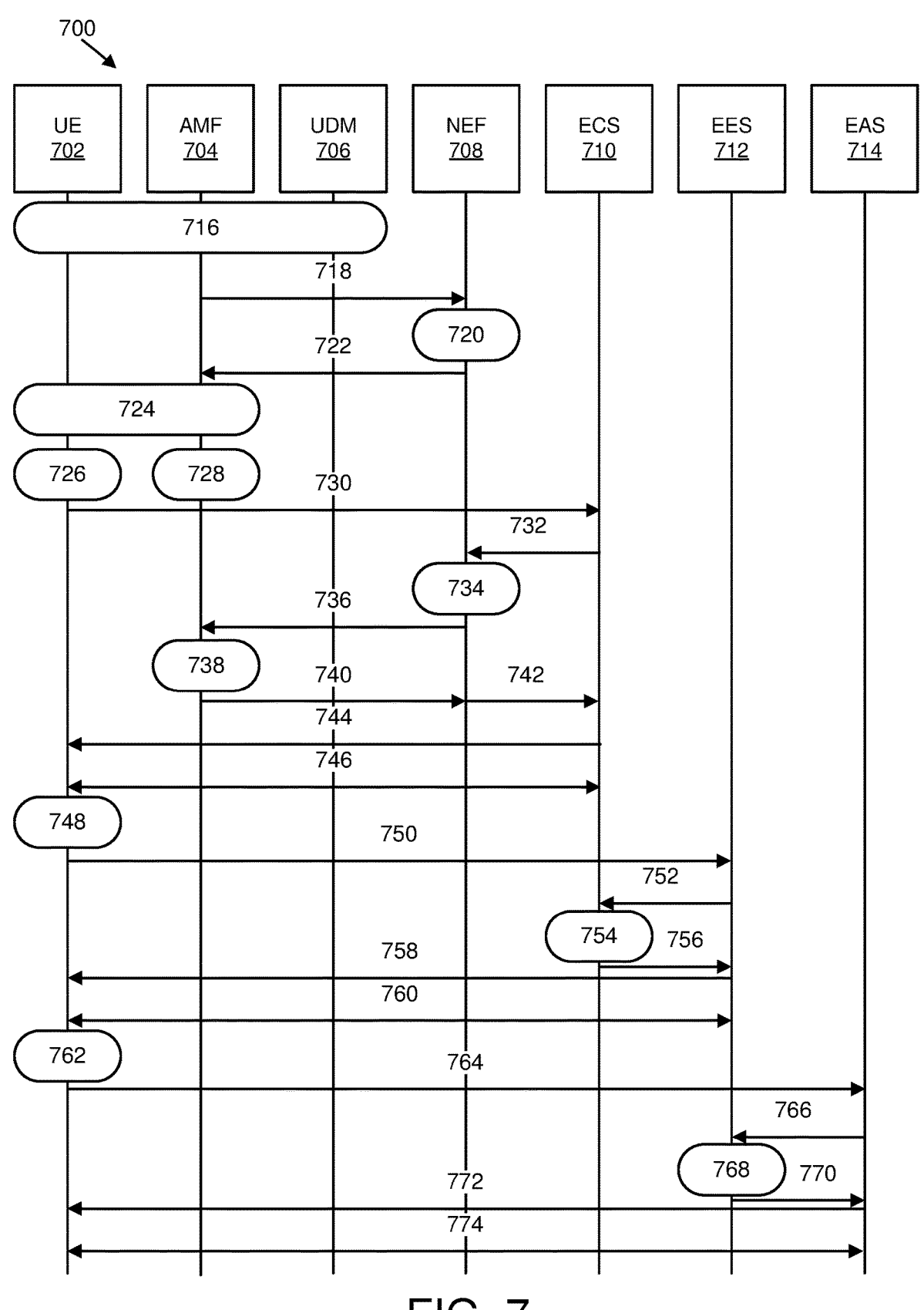
FIG. 7 is a communications diagram illustrating yet another embodiment of communications for correlating a user equipment and an access and mobility management function.

FIG. 7 is a communications diagram illustrating yet another embodiment of communications 700 for correlating a user equipment and an access and mobility management function (e.g., illustrating an example of the first embodiment). The communications 700 include messages transmitted between a UE 702 (e.g., UE and/or EEC), an AMF 704, a UDM 706 (e.g., UDM, UDR, and/or AUSF), an NEF 708, an ECS 710, an EES 712, and an EAS 714. As may be appreciated, each communication of the communications 700 may include one or more messages.

In a first communication 716 transmitted between the UE 702, the AMF 704, and the UDM 706, the UE 702 performs primary authentication and registration with a network. The UE 702 may be MEC capable and/or may indicate this in MEC capabilities provided to the AMF 704 during a registration procedure. The UE 702 may provide its GPSI to the AMF 704 during the registration procedure, or the AMF 704 may receive the GPSI from the UDM 706 with the subscription profile.

In a second communication 718 transmitted from the AMF 704 to the NEF 708, the AMF 704 sends an identity registration request to the NEF 708 (e.g., the identity registration request may include the GPSI).

The NEF 708 stores 720 the GPSI and an AMF ID together.

In a third communication 722 transmitted from the NEF 708 to the AMF 704, the NEF 708 acknowledges the identity registration request with a message transmitted to the AMF 704.

In a fourth communication 724 transmitted between the UE 702 and the AMF 704, the UE 702 establishes a PDU session for IP connectivity with the AMF 704.

If the UE 702 is MEC capable, then the UE 702 derives 726 a key $K_{ECS}$ for authentication with the ECS 710 from the AMF 704 key $K_{AMF}$ and the AMF 704 derives 728 a key $K_{ECS}$ for authentication with the ECS 710 from the AMF 704 key $K_{AMF}$.

In a fifth communication 730 transmitted from the UE 702 to the ECS 710, the UE 702 sends an application registration request with a MAC-$I_{ECS}$ and a GPSI to the ECS 710. The MAC-$I_{ECS}$ may be computed similar to an SOR-MAC- $I_{AUSF}$. The MAC-$I_{ECS}$ may be based on a payload of the application registration request which may form input application registration request data and may include the key $K_{ECS}$ to the KDF. The MAC-$I_{ECS}$ may be identified with the 128 least significant bits of an output of the KDF.

In a sixth communication 732 transmitted from the ECS 710 to the NEF 708, the UE 702 is not authenticated at the ECS 710 and the ECS 710 sends a key request including the application registration request with the MAC-$I_{ECS}$ to the NEF 708 which may be selected based on the GPSI.

The NEF 708 authorizes 734 the request message from the ECS 710 and identifies the AMF ID based on the GPSI. The NEF 708 stores contact information of the ECS 710 (e.g., IP address, source NAI of the ECS 710, and so forth) with the GPSI to route an answer from the AMF 704 back to the ECS 710.

In a seventh communication 736 transmitted from the NEF 708 to the AMF 704, the NEF 708 forwards the key request including the application registration request with the MAC-$I_{ECS}$ and the GPSI to the AMF 704.

The AMF 704 verifies 738 the MAC-$I_{ECS}$ of the application registration request. The AMF 704 computes with the key $K_{ECS}$, the MAC-I over the application registration request payload in the similar way as the UE 702 and compares the result with the MAC-$I_{ECS}$ included in the message. If both are identical, the message may be authenticated to be sent by the UE 702.

In an eighth communication 740 transmitted from the AMF 704 to the NEF 708 and/or in a ninth communication 742 transmitted from the NEF 708 to the ECS 710, the AMF 704 sends a key response to the ECS 710 including the result of the authentication as well as the $K_{ECS}$.

In a tenth communication 744 transmitted from the ECS 710 to the UE 702, based on the authentication result, the ECS 710 decides whether to accept or to reject the application registration request from the UE 702. The ECS 710 sends an application registration response message to the UE 702 including the authentication result and protects the message with a MAC-$I_{ECS}$ based on the received key $K_{ECS}$ in a similar way as the UE 702 protected the payload of the third communication 722.

In an eleventh communication 746 transmitted between the UE 702 and the ECS 710, the UE 702 verifies the MAC-$I_{ECS}$ and, if the authentication result and verification of the message are successful, then the UE 702 establishes an IPsec SA between the UE 702 and ECS 710 by using the ECS key $K_{ECS}$. Accordingly, all messages may now be confidentiality and integrity protected by the IPsec tunnel.

The UE 702 derives 748 the key $K_{EES}$ from the key $K_{ECS}$ using a MEC key distinguisher flag as input to the KDF.

In a twelfth communication 750 transmitted from the UE 702 to the EES 712, the UE 702 sends an application registration request with a MAC-$I_{EES}$ to the EES 712. The MAC-$I_{EES}$ may be computed based on the payload of the application registration request, which may form input application registration request data, and may include the key $K_{EES}$ to the KDF. The MAC-$I_{EES}$ may be identified with the 128 least significant bits of the output of the KDF.

In a thirteenth communication 752 transmitted from the EES 712 to the ECS 710, the UE 702 may not be authenticated at the EES 712 and the EES 712 sends a key request to the ECS 710. The selection of the ECS 710 may be based on the UE ID.

The ECS 710 identifies 754 the UE 702 based on the UE ID and derives the key $K_{EES}$ in a similar way as the UE 702 in the seventh communication 736. The ECS 710 verifies the MAC-$I_{EES}$ of the application registration request. The ECS

710 computes with the key $K_{EES}$, the MAC-I over the application registration request payload in the similar way as the UE 702 and compares the result with the MAC-I$_{EES}$ included in the message. If both are identical, the message may be authenticated to be sent by the UE 702.

In a fourteenth communication 756 transmitted from the ECS 710 to the EES 712, the ECS 710 sends a key request response to the EES 712. The key request response may include the result of the authentication as well as the $K_{EES}$.

Based on the authentication result the EES 712 decides whether to accept or to reject the application registration request from the UE 702. In a fifteenth communication 758 transmitted from the EES 712 to the UE 702, the EES 712 sends the application registration response message to the UE 702—including the authentication result, and protects the message with a MAC-I$_{EES}$ based on the received key $K_{EES}$ in a similar way as the UE 702 protected the payload of the message in the eighth communication 740.

In a sixteenth communication 760 transmitted between the UE 702 and the EES 712, the UE 702 verifies the MAC-I$_{EES}$ and, if the authentication result and verification of the message are successful, then the UE 702 establishes an IPsec SA between the UE 702 and EES 712 by using the EES key $K_{EES}$. All messages may be confidentiality and integrity protected by the IPsec tunnel.

The UE 702 derives 762 the key $K_{EAS}$ from the key $K_{EES}$ using a MEC key distinguisher flag as input to the KDF.

In a seventeenth communication 764 transmitted from the UE 702 to the EAS 714, the UE 702 sends an application registration request with a MAC-I$_{EAS}$ to the EAS 714. The MAC-I$_{EAS}$ is computed based on the payload of the application registration request, which may form input application registration request data, and may include the key $K_{EAS}$ to the KDF. The MAC-T$_{EAS}$ may be identified with the 128 least significant bits of the output of the KDF.

In an eighteenth communication 766 transmitted from the EAS 714 to the EES 712, the UE 702 is not authenticated at the EAS 714 and the EAS 714 sends a key request to the EES 712. The selection of the EES 712 may be based on the UE ID.

The EES 712 identifies 768 the UE 702 based on the UE ID and derives the key $K_{EAS}$ in a similar way as the UE 702 step 762. The EES 712 verifies the MAC-I$_{EAS}$ of the application registration request. The EES 712 computes with the key $K_{EAS}$ the MAC-I over the application registration request payload in the similar way as the UE 702 and compares the result with the MAC-I$_{EAS}$ included in the message. If both are identical, the message may be authenticated to be sent by the UE 702.

In a nineteenth communication 770 transmitted from the EES 712 to the EAS 714, the EES 712 sends a key request response to the EAS 714 including the result of the authentication as well as the $K_{EAS}$.

In a twentieth communication 772 transmitted from the EAS 714 to the UE 702, based on the authentication result, the EAS 714 decides whether to accept or to reject the application registration request from the UE 702. The EAS 714 sends the application registration response message to the UE 702 including the authentication result and protects the message with a MAC-I$_{EAS}$ based on the received key $K_{EAS}$ in a similar way as the UE 702 protected the payload of the message in the fifth communication 730.

In a twenty-first communication 774 transmitted between the UE 702 and the EAS 714, the UE 702 verifies the MAC-I$_{EAS}$ and, if an authentication result and verification of the message are successful, then the UE 702 establishes an IPsec SA between the UE 702 and the EAS 714 by using the EAS key $K_{EAS}$. All messages may now be confidentiality and integrity protected by the IPsec tunnel.

In a fifth embodiment, an authentication procedure may be performed based on the second embodiment.

Figure 8:
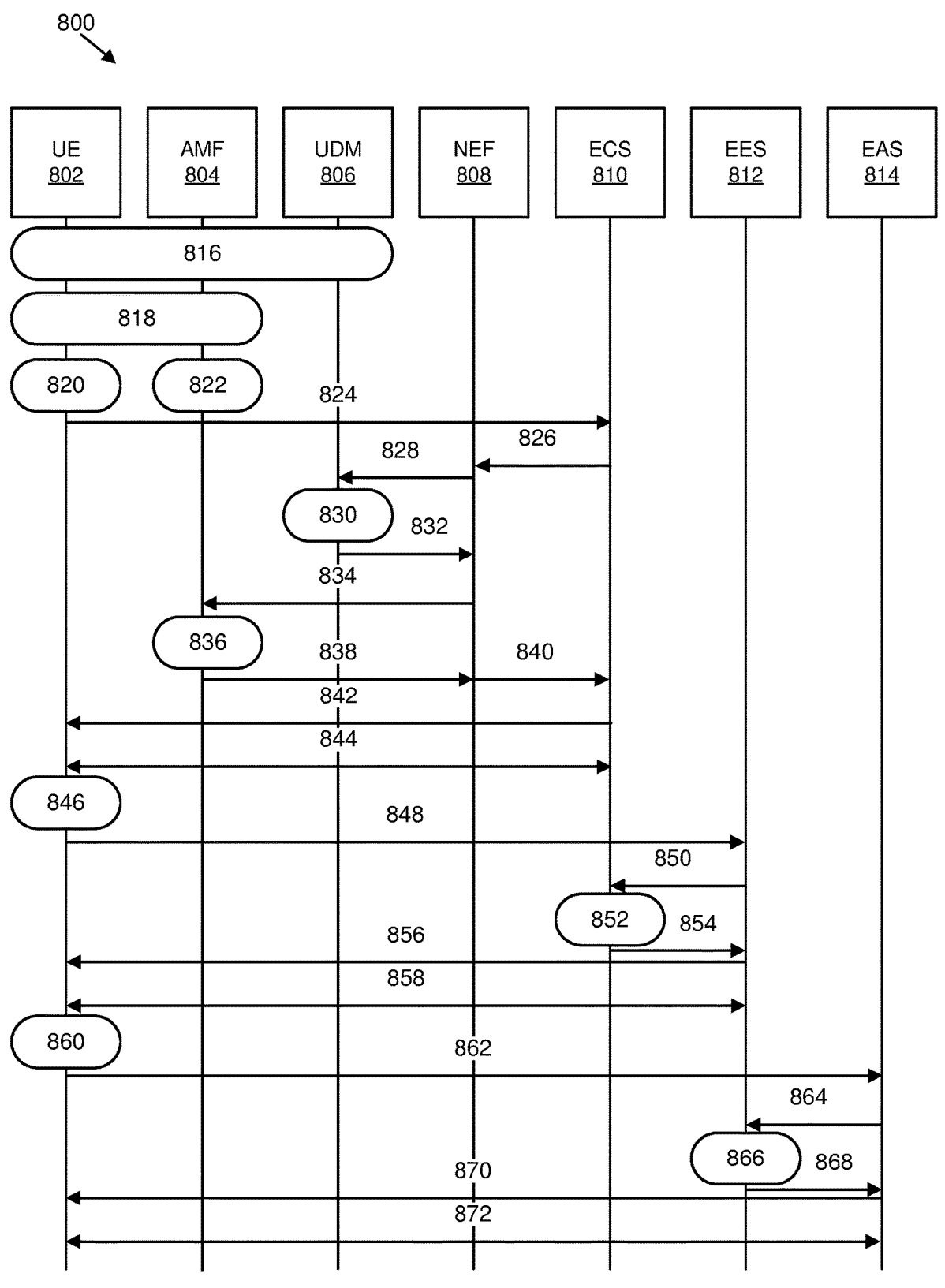
FIG. 8 is a communications diagram illustrating an additional embodiment of communications for correlating a user equipment and an access and mobility management function.

FIG. 8 is a communications diagram illustrating an additional embodiment of communications 800 for correlating a user equipment and an access and mobility management function (e.g., illustrating an example of the second embodiment). The communications 800 include messages transmitted between a UE 802 (e.g., UE and/or EEC), an AMF 804, a UDM 806 (e.g., UDM, UDR, and/or AUSF), an NEF 808, an ECS 810, an EES 812, and an EAS 814. As may be appreciated, each communication of the communications 800 may include one or more messages.

In a first communication 816 transmitted between the UE 802, the AMF 804, and the UDM 806, the UE 802 performs primary authentication and registration with a network. The UE 802 may be MEC capable and/or may indicate this in MEC capabilities provided to the AMF 804 during a registration procedure.

In a second communication 818 transmitted between the UE 802 and the AMF 804, the UE 802 establishes a PDU session for IP connectivity.

If the UE 802 is MEC capable, then the UE 802 derives 820 a key $K_{ECS}$ for authentication with the ECS 810 from the AMF 804 key $K_{AMF}$ and the AMF 804 derives 822 a key $K_{ECS}$ for authentication with the ECS 810 from the AMF 804 key $K_{AMF}$.

In a third communication 824 transmitted from the UE 802 to the ECS 810, the UE 802 sends an application registration request with a MAC-I$_{ECS}$ and a GPSI to the ECS 810. The MAC-I$_{ECS}$ may be computed similar to an SOR-MAC-I$_{AUSF}$. The MAC-I$_{ECS}$ may be based on a payload of the application registration request which may form input application registration request data and may include the key $K_{ECS}$ to the KDF. The MAC-I$_{ECS}$ may be identified with the 128 least significant bits of an output of the KDF.

In a fourth communication 826 transmitted from the ECS 810 to the NEF 808, the UE 802 is not authenticated at the ECS 810 and the ECS 810 sends a key request including the application registration request with the MAC-I$_{ECS}$ to the NEF 808 which may be selected based on the GPSI.

The NEF 808 authorizes the request message from the ECS 810 and, in a fifth communication 828 transmitted from the NEF 808 to the UDM 806, the NEF 808 sends an AMF discovery request to the UDM 806 with the GPSI. The NEF 808 stores the contact of the ECS 810 (e.g., IP address, source NAI of the ECS 810, and so forth) with the GPSI to facilitate routing an answer from the AMF 804 back to the ECS 810.

The UDM 806 performs 830 a lookup of the AMF ID based on the GPSI. The GPSI may be already part of a subscription profile or may be provided by the UE 802 during the registration procedure with the network and updated by the AMF 804. The AMF ID may already be known in the UDM 806 due to a previous registration procedure.

In a sixth communication 832 transmitted from the UDM 806 to the NEF 808, the UDM 806 provides the AMD ID back to the NEF 808.

In a seventh communication 834 transmitted from the NEF 808 to the AMF 804, the NEF 808 forwards the key request including the application registration request with the MAC-I$_{ECS}$ as well as the GPSI to the AMF 804.

The AMF 804 verifies 836 the MAC-I$_{ECS}$ of the application registration request. The AMF 804 computes with the key $K_{ECS}$, the MAC-I over the application registration request payload in the similar way as the UE 802 and compares the result with the MAC-I$_{ECS}$ included in the message. If both are identical, the message may be authenticated to be sent by the UE 802.

In an eighth communication 838 transmitted from the AMF 804 to the NEF 808 and/or in a ninth communication 840 transmitted from the NEF 808 to the ECS 810, the AMF 804 sends a key response to the ECS 810 including the result of the authentication as well as the K$_{ECS}$.

In a tenth communication 842 transmitted from the ECS 810 to the UE 802, based on the authentication result, the ECS 810 decides whether to accept or to reject the application registration request from the UE 802. The ECS 810 sends an application registration response message to the UE 802 including the authentication result and protects the message with a MAC-I$_{ECS}$ based on the received key K$_{ECS}$ in a similar way as the UE 802 protected the payload of the third communication 824.

In an eleventh communication 844 transmitted between the UE 802 and the ECS 810, the UE 802 verifies the MAC-I$_{ECS}$ and, if the authentication result and verification of the message are successful, then the UE 802 establishes an IPsec SA between the UE 802 and ECS 810 by using the ECS key K$_{ECS}$. Accordingly, all messages may now be confidentiality and integrity protected by the IPsec tunnel.

The UE 802 derives 846 the key K$_{EES}$ from the key K$_{ECS}$ using a MEC key distinguisher flag as input to the KDF.

In a twelfth communication 848 transmitted from the UE 802 to the EES 812, the UE 802 sends an application registration request with a MAC-I$_{EES}$ to the EES 812. The MAC-I$_{EES}$ may be computed based on the payload of the application registration request, which may form input application registration request data, and may include the key K$_{EES}$ to the KDF. The MAC-I$_{EES}$ may be identified with the 128 least significant bits of the output of the KDF.

In a thirteenth communication 850 transmitted from the EES 812 to the ECS 810, the UE 802 may not be authenticated at the EES 812 and the EES 812 sends a key request to the ECS 810. The selection of the ECS 810 may be based on the UE ID.

The ECS 810 identifies 852 the UE 802 based on the UE ID and derives the key K$_{EES}$ in a similar way as the UE 802 in the seventh communication 836. The ECS 810 verifies the MAC-I$_{EES}$ of the application registration request. The ECS 810 computes with the key K$_{EES}$, the MAC-I over the application registration request payload in the similar way as the UE 802 and compares the result with the MAC-I$_{EES}$ included in the message. If both are identical, the message may be authenticated to be sent by the UE 802.

In a fourteenth communication 854 transmitted from the ECS 810 to the EES 812, the ECS 810 sends a key request response to the EES 812. The key request response may include the result of the authentication as well as the K$_{EES}$.

Based on the authentication result the EES 812 decides whether to accept or to reject the application registration request from the UE 802. In a fifteenth communication 856 transmitted from the EES 812 to the UE 802, the EES 812 sends the application registration response message to the UE 802—including the authentication result, and protects the message with a MAC-I$_{EES}$ based on the received key K$_{EES}$ in a similar way as the UE 802 protected the payload of the message in the eighth communication 840.

In a sixteenth communication 858 transmitted between the UE 802 and the EES 812, the UE 802 verifies the MAC-I$_{EES}$ and, if the authentication result and verification of the message are successful, then the UE 802 establishes an IPsec SA between the UE 802 and EES 812 by using the EES key K$_{EES}$. All messages may be confidentiality and integrity protected by the IPsec tunnel.

The UE 802 derives 860 the key K$_{EAS}$ from the key K$_{EES}$ using a MEC key distinguisher flag as input to the KDF.

In a seventeenth communication 862 transmitted from the UE 802 to the EAS 814, the UE 802 sends an application registration request with a MAC-I$_{EAS}$ to the EAS 814. The MAC-I$_{EAS}$ is computed based on the payload of the application registration request, which may form input application registration request data, and may include the key K$_{EAS}$ to the KDF. The MAC-I$_{EAS}$ may be identified with the 128 least significant bits of the output of the KDF.

In an eighteenth communication 864 transmitted from the EAS 814 to the EES 812, the UE 802 is not authenticated at the EAS 814 and the EAS 814 sends a key request to the EES 812. The selection of the EES 812 may be based on the UE ID.

The EES 812 identifies 866 the UE 802 based on the UE ID and derives the key K$_{EAS}$ in a similar way as the UE 802 step 862. The EES 812 verifies the MAC-I$_{EAS}$ of the application registration request. The EES 812 computes with the key K$_{EAS}$ the MAC-T over the application registration request payload in the similar way as the UE 802 and compares the result with the MAC-I$_{EAS}$ included in the message. If both are identical, the message may be authenticated to be sent by the UE 802.

In a nineteenth communication 868 transmitted from the EES 812 to the EAS 814, the EES 812 sends a key request response to the EAS 814 including the result of the authentication as well as the K$_{EAS}$.

In a twentieth communication 870 transmitted from the EAS 814 to the UE 802, based on the authentication result, the EAS 814 decides whether to accept or to reject the application registration request from the UE 802. The EAS 814 sends the application registration response message to the UE 802 including the authentication result and protects the message with a MAC-I$_{EAS}$ based on the received key K$_{EAS}$ in a similar way as the UE 802 protected the payload of the message in the fifth communication 830.

In a twenty-first communication 872 transmitted between the UE 802 and the EAS 814, the UE 802 verifies the MAC-I$_{EAS}$ and, if an authentication result and verification of the message are successful, then the UE 802 establishes an IPsec SA between the UE 802 and the EAS 814 by using the EAS key K$_{EAS}$. All messages may now be confidentiality and integrity protected by the IPsec tunnel.

Figure 9:
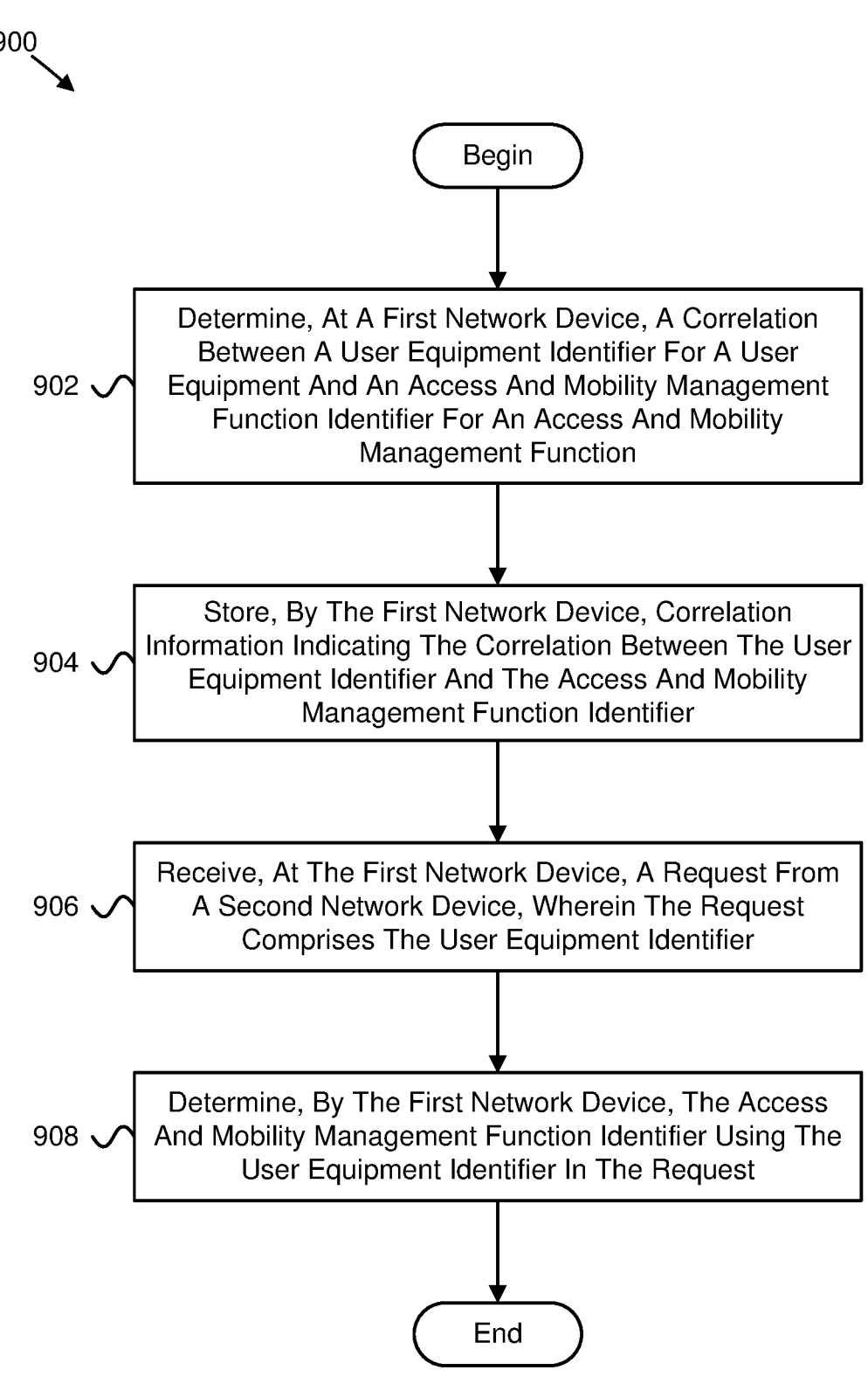
FIG. 9 is a schematic flow chart diagram illustrating one embodiment of a method for correlating a user equipment and an access and mobility management function.

FIG. 9 is a schematic flow chart diagram illustrating one embodiment of a method 900 for correlating a user equipment and an access and mobility management function. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include determining 902, at a first network device, a correlation between a user equipment identifier for a user equipment and an access and mobility management function identifier for an access and mobility management function. In certain embodiments, the method 900 includes storing 904, by the first network device, correlation information indicating the correlation between the user equipment identifier and the access and mobility management function identifier. In various embodiments, the method 900 includes receiving 906, at the first network device, a request from a second network device, wherein the request comprises the user equipment identifier. In some embodiments, the method 900 includes determining 908, by the first network device, the access and mobility management function identifier using the user equipment identifier in the request.

In various embodiments, determining the correlation between the user equipment identifier and the access and mobility management function identifier comprises receiving a message comprising the user equipment identifier, the access and mobility management function identifier, or a combination thereof. In some embodiments, receiving the message comprises receiving the message from the access and mobility management function. In certain embodiments, the method 900 further comprises binding the user equipment identifier and the access and mobility management function identifier.

In one embodiment, the method 900 further comprises sending a response message to the access and mobility management function indicating a success of binding the user equipment identifier and the access and mobility management function identifier. In various embodiments, the method 900 further comprises, in response to determining the access and mobility management function identifier using the user equipment identifier in the request, transmitting the request to the access and mobility management function. In some embodiments, the method 900 further comprises, in response to determining the access and mobility management function identifier using the user equipment identifier in the request, transmitting a response to the second network device.

In certain embodiments, the response comprises the access and mobility management function identifier and a modified user equipment identifier. In one embodiment, the user equipment identifier comprises a generic public subscription identifier and the modified user equipment identifier comprises a subscription permanent identifier. In various embodiments, the first network device comprises a network exposure function, unified data management function, a session management function, or a combination thereof.

In some embodiments, the second network device comprises an edge configuration server, a network exposure function, or a combination thereof. In certain embodiments, the user equipment identifier comprises a user equipment internet protocol address and port number. In one embodiment, the method 900 further comprises, in response to determining the access and mobility management function identifier using the user equipment identifier in the request, transmitting a response to the second network device.

In various embodiments, the response comprises the access and mobility management function identifier and a modified user equipment identifier. In some embodiments, the modified user equipment identifier comprises a generic public subscription identifier.

In one embodiment, a method comprises: determining, at a first network device, a correlation between a user equipment identifier for a user equipment and an access and mobility management function identifier for an access and mobility management function; storing, by the first network device, correlation information indicating the correlation between the user equipment identifier and the access and mobility management function identifier; receiving, at the first network device, a request from a second network device, wherein the request comprises the user equipment identifier; and determining, by the first network device, the access and mobility management function identifier using the user equipment identifier in the request.

In various embodiments, determining the correlation between the user equipment identifier and the access and mobility management function identifier comprises receiving a message comprising the user equipment identifier, the access and mobility management function identifier, or a combination thereof.

In some embodiments, receiving the message comprises receiving the message from the access and mobility management function.

In certain embodiments, the method further comprises binding the user equipment identifier and the access and mobility management function identifier.

In one embodiment, the method further comprises sending a response message to the access and mobility management function indicating a success of binding the user equipment identifier and the access and mobility management function identifier.

In various embodiments, the method further comprises, in response to determining the access and mobility management function identifier using the user equipment identifier in the request, transmitting the request to the access and mobility management function.

In some embodiments, the method further comprises, in response to determining the access and mobility management function identifier using the user equipment identifier in the request, transmitting a response to the second network device.

In certain embodiments, the response comprises the access and mobility management function identifier and a modified user equipment identifier.

In one embodiment, the user equipment identifier comprises a generic public subscription identifier and the modified user equipment identifier comprises a subscription permanent identifier.

In various embodiments, the first network device comprises a network exposure function, unified data management function, a session management function, or a combination thereof.

In some embodiments, the second network device comprises an edge configuration server, a network exposure function, or a combination thereof.

In certain embodiments, the user equipment identifier comprises a user equipment internet protocol address and port number.

In one embodiment, the method further comprises, in response to determining the access and mobility management function identifier using the user equipment identifier in the request, transmitting a response to the second network device.

In various embodiments, the response comprises the access and mobility management function identifier and a modified user equipment identifier.

In some embodiments, the modified user equipment identifier comprises a generic public subscription identifier.

In one embodiment, an apparatus comprises a first network device. The apparatus further comprises: a processor that: determines a correlation between a user equipment identifier for a user equipment and an access and mobility management function identifier for an access and mobility management function; and stores correlation information indicating the correlation between the user equipment identifier and the access and mobility management function identifier; and a receiver that receives a request from a second network device, wherein the request comprises the user equipment identifier; wherein the processor determines the access and mobility management function identifier using the user equipment identifier in the request.

In various embodiments, the processor determining the correlation between the user equipment identifier and the access and mobility management function identifier comprises the receiver receiving a message comprising the user equipment identifier, the access and mobility management function identifier, or a combination thereof.

In some embodiments, the receiver receiving the message comprises the receiver receiving the message from the access and mobility management function.

In certain embodiments, the processor binds the user equipment identifier and the access and mobility management function identifier.

In one embodiment, the apparatus further comprises a transmitter that sends a response message to the access and mobility management function indicating a success of binding the user equipment identifier and the access and mobility management function identifier.

In various embodiments, the apparatus further comprises a transmitter, wherein, in response to determining the access and mobility management function identifier using the user equipment identifier in the request, the transmitter transmits the request to the access and mobility management function.

In some embodiments, the apparatus further comprises a transmitter, wherein, in response to determining the access and mobility management function identifier using the user equipment identifier in the request, the transmitter transmits a response to the second network device.

In certain embodiments, the response comprises the access and mobility management function identifier and a modified user equipment identifier.

In one embodiment, the user equipment identifier comprises a generic public subscription identifier and the modified user equipment identifier comprises a subscription permanent identifier.

In various embodiments, the first network device comprises a network exposure function, unified data management function, a session management function, or a combination thereof.

In some embodiments, the second network device comprises an edge configuration server, a network exposure function, or a combination thereof.

In certain embodiments, the user equipment identifier comprises a user equipment internet protocol address and port number.

In one embodiment, the apparatus further comprises a transmitter, wherein, in response to determining the access and mobility management function identifier using the user equipment identifier in the request, the transmitter transmits a response to the second network device.

In various embodiments, the response comprises the access and mobility management function identifier and a modified user equipment identifier.

In some embodiments, the modified user equipment identifier comprises a generic public subscription identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a first network device, comprising:
 determining a correlation between a user equipment (UE) identifier (ID) for a UE and an access and mobility management function (AMF) ID for an AMF;
 storing correlation information indicating the correlation between the UE ID and the AMF ID;

receiving a request from a second network device, wherein the request comprises the UE ID;
 determining the AMF ID using the UE ID in the request and based on the correlation information; and
 in response to determining the AMF ID, transmitting a response to the second network device.

2. The method of claim 1, wherein determining the correlation between the UE ID and the AMF ID comprises receiving a message comprising the UE ID, the AMF ID, or a combination thereof.

3. The method of claim 2, wherein receiving the message comprises receiving the message from the AMF.

4. The method of claim 3, further comprising binding the UE ID and the AMF ID.

5. The method of claim 4, further comprising sending a response message to the AMF indicating a success of binding the UE ID and the AMF ID.

6. The method of claim 1, further comprising, in response to determining the AMF ID using the UE ID in the request, transmitting the request to the AMF.

7. The method of claim 1, wherein the response comprises the AMF ID and a modified UE ID.

8. The method of claim 7, wherein the UE ID comprises a generic public subscription identifier (GPSID) and the modified UE ID comprises a subscription permanent identifier (SPID).

9. The method of claim 1, wherein the first network device comprises a network exposure function (NEF), unified data management (UDM) function, a session management function (SMF), or a combination thereof.

10. The method of claim 1, wherein the second network device comprises an edge configuration server (ECS), a network exposure function (NEF), or a combination thereof.

11. The method of claim 1, wherein the UE ID comprises a user equipment internet protocol address and port number.

12. The method of claim 11, further comprising, in response to determining the AMF ID using the UE ID in the request, transmitting a response to the second network device.

13. The method of claim 12, wherein the response comprises the AMF ID and a modified UE ID.

14. The method of claim 13, wherein the modified UE ID comprises a generic public subscription identifier.

15. An apparatus for wireless communication, the apparatus comprising:
 a processor; and
 a memory coupled to the processor, the memory comprising instructions executable by the processor to cause the apparatus to:
  determine a correlation between a user equipment (UE) identifier (ID) for a user equipment and an access and mobility management function (AMF) identifier (ID) for an AMF; and
  store correlation information indicating the correlation between the UE ID and the AMF ID;
  receive a request from a second network device, wherein the request comprises the UE ID;
  determine the AMF ID using the UE ID in the request and based on the correlation information; and
  in response to determining the AMF ID, transmit a response to the second network device.

16. The apparatus of claim 15, wherein the instructions are further executable by the processor to cause the apparatus to determine the correlation between the UE ID and the AMF ID by receiving a message comprising the UE ID, the AMF ID, or a combination thereof.

17. The apparatus of claim 15, wherein the instructions are further executable by the processor to cause the apparatus to, in response to determining the AMF ID using the UE ID in the request, transmit the request to the AMF.

18. The apparatus of claim 15, wherein the apparatus comprises a network exposure function (NEF), unified data management (UDM) function, a session management function (SMF), or a combination thereof.

19. The apparatus of claim 15, wherein the second network device comprises an edge configuration server (ECS), a network exposure function (NEF), or a combination thereof.

* * * * *